(12) United States Patent
Wakaki

(10) Patent No.: US 9,512,990 B2
(45) Date of Patent: Dec. 6, 2016

(54) LIGHT EMITTING DEVICE MOUNTING STRUCTURAL BODY

(71) Applicant: NICHIA CORPORATION, Anan-shi, Tokushima (JP)

(72) Inventor: Ryosuke Wakaki, Tokushima (JP)

(73) Assignee: NICHIA CORPORATION, Anan-Shi (JP)

( * ) Notice: Subject to any disclaimer, the term of this patent is extended or adjusted under 35 U.S.C. 154(b) by 20 days.

(21) Appl. No.: 14/505,519

(22) Filed: Oct. 3, 2014

(65) Prior Publication Data
US 2015/0098248 A1 Apr. 9, 2015

(30) Foreign Application Priority Data

Oct. 3, 2013 (JP) .................................. 2013-208224
Sep. 25, 2014 (JP) .................................. 2014-194825

(51) Int. Cl.
| | |
|---|---|
| H01L 21/00 | (2006.01) |
| F21V 23/00 | (2015.01) |
| F21V 21/00 | (2006.01) |
| F21V 7/00 | (2006.01) |
| F21V 8/00 | (2006.01) |

(52) U.S. Cl.
CPC .............. *F21V 23/001* (2013.01); *F21V 7/00* (2013.01); *F21V 21/00* (2013.01); *G02B 6/002* (2013.01); *G02B 6/0068* (2013.01); *G02B 6/0073* (2013.01); *G02B 6/0091* (2013.01); *G02B 6/0085* (2013.01)

(58) Field of Classification Search
CPC .......... F21V 23/001; F21V 7/00; F21V 21/00; G02B 6/0055; G02B 6/0073
See application file for complete search history.

(56) References Cited

U.S. PATENT DOCUMENTS 8,525,208 B2 * 9/2013 Kanada .................. H01L 33/62
257/676
2002/0180923 A1 12/2002 Aoyagi et al.
2003/0227769 A1 12/2003 Osawa
(Continued)

FOREIGN PATENT DOCUMENTS

| JP | 2002-335000 A | 11/2002 |
|---|---|---|
| JP | 2002-350850 A | 12/2002 |

(Continued)

*Primary Examiner* — Tracie Y Green
(74) *Attorney, Agent, or Firm* — Foley & Lardner LLP

(57) ABSTRACT

A light emitting device mounting structural body includes a wiring substrate having wirings disposed on a base member and a light emitting device having a resin molded body mounted on the wiring substrate. The wiring substrate has a recess in its periphery. The resin molded body has a lower surface and a side surface. The lower surface has an arrangement portion and a projecting portion, the arrangement portion has an outer lead electrically connected to the wiring portion disposed beneath the arrangement portion, and the projecting portion is projected further downward relative to the arrangement portion. The side surface has an opening with a light emitting element mounted thereon, the opening is expanded in the projecting portion, and at least a portion of the opening is housed in the recess of the wiring substrate.

20 Claims, 12 Drawing Sheets

(56) References Cited

U.S. PATENT DOCUMENTS

2004/0211986 A1* 10/2004 Minamio .......... H01L 27/14618
 257/222
2006/0092665 A1   5/2006 Kim et al.

FOREIGN PATENT DOCUMENTS

| JP | 2003-218400 A | 7/2003 |
| JP | 2003-298119 A | 10/2003 |
| JP | 2004-063541 A | 2/2004 |
| JP | 2004-207688 A | 7/2004 |
| JP | 2006-135280 A | 5/2006 |

* cited by examiner

LIGHT EMITTING DEVICE MOUNTING STRUCTURAL BODY

This application claims priority to Japanese Patent Applications No. 2013-208224 filed on Oct. 3, 2013, and No. 2014-194825 filed on Sep. 25, 2014. The entire disclosure of Japanese Patent Applications No. 2013-208224 and 2014-194825 are hereby incorporated herein by reference.

BACKGROUND

1. Technical Field

The present disclosure relates to a light emitting device mounting structural body in which a light emitting device is mounted on a wiring substrate.

2. Background Art

In recent years, light emitting diodes (LEDs) have been used in various fields, as light sources for lighting devices or display devises. Particularly, many side-emission type (side-view type) LEDs are used in the field of backlight for liquid crystal display devices such as TVs, mobile phones, monitors, and indicators, with increasing demands for smaller size and light weight along with the expanding multi-functionality. A side-emission LED is mounted with its light emitting surface perpendicular to an upper surface of a wiring substrate so that light is incident on an end surface of a light guide, allowing uniform emission luminance substantially over the whole area of a screen of a display or the like.

Such a side-emission LED may be provided with a pair of step portions on the bottom-surface of the housing for emitting light in the front direction of the housing, as illustrated in JP 2006-19313A. An outer lead portion of each of the lead terminals which are integrally formed with the housing is arranged with bent shape along the housing, at each of the step portions. The bottom surface of the housing and the bottom surface of the electrode portions are positioned approximately flush with each other, which allows for stable mounting of an LED indicator on a circuit board. Further, a variation in height of the LED indicators after mounting can be reduced.

JP2003-218400A discloses a light emitting device which has a chip type light emitting device provided with a connection terminal at both of the longitudinal sides, and a wiring substrate for mounting the chip type light emitting device. The wiring substrate is provided with a portion of a cut part for embedding the chip type light emitting device. Thus, a decrease of a thickness in a height direction of the chip type light emitting device can be obtained, which allows securely fixing the light emitting device on the wiring substrate.

Further, JP2003-135280A discloses a backlight having a light emitting diode, in which a lower portion of a package body of the light emitting diode is projected in the same direction as the terminal, and the lower portion is housed in a recess of the substrate. With such a configuration, the mounting height of the light emitting diodes in the backlight can be reduced.

With the configuration as described above, a light emitting device having good mountability to a substrate member can be formed. Also, a thin-type backlight can be formed. Further improvement in the emission output has been addressed and in order to accomplish that objective, further increase in the light emitting region seems to be effective. However, in the backlight described in JP 2006-135280 A, a light guide plate is arranged on the substrate, so that the emitted light from a window of an LED which is housed in the recess cannot be incident in the light guide plate.

The present disclosure is directed in view of the disadvantages outlined above, and is aimed to provide a light emitting device mounting structural body which allows an increase of light emitting region while facilitating mounting of a light emitting device on a wiring substrate, and which also allows efficient incident of light emitted from the expanded light emitting region onto the light guide member.

SUMMARY

A light emitting device mounting structural body includes a wiring substrate which has wirings disposed on a base member and a light emitting device which has a resin molded body mounted on the wiring substrate. The wiring substrate has a recess in its periphery. The resin molded body has a lower surface and a side surface. The lower surface has an arrangement portion and a projecting portion. The arrangement portion has an outer lead electrically connected to the wiring portion disposed beneath the arrangement portion. The projecting portion is projected further downward relative to the arrangement portion. The side surface has an opening with a light emitting element mounted thereon. The opening is expanded in the projecting portion. At least a portion of the opening is housed in the recess of the wiring substrate.

The present disclosure is directed in view of the disadvantages described above, and is aimed to provide a light emitting device mounting structural body which allows an increase of light emitting region while facilitating mounting of a light emitting device on a wiring substrate, and which also allows efficient incident of light emitted from the increased light emitting region onto the light guide member.

DETAILED DESCRIPTION OF EMBODIMENTS

Figure 1:
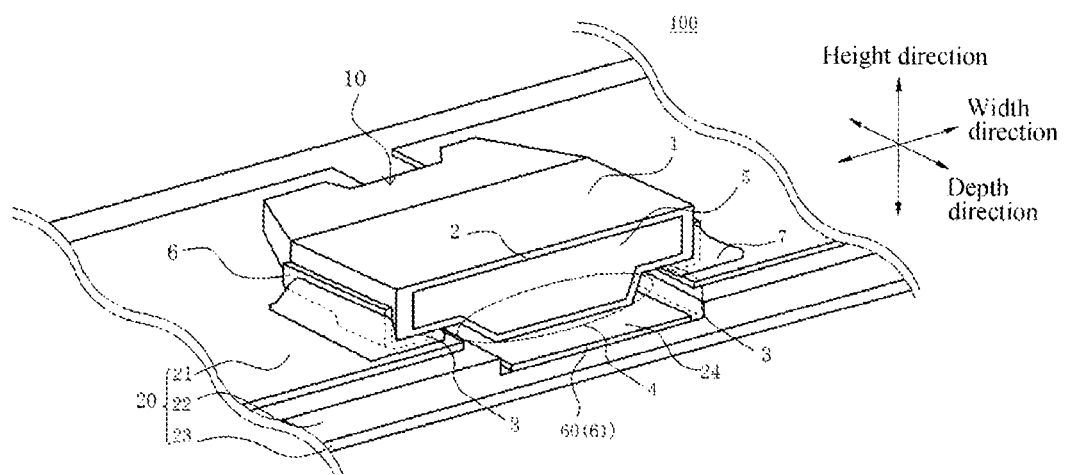
FIG. 1 is a schematic perspective view of a light emitting device mounting structural body according to an embodiment of the present invention.

The embodiments according to the present invention will be described below with reference to the drawings. The light emitting device mounting structural bodies described below are intended as illustrative, and the sizes, materials, shapes and the relative configuration etc. of the members described in embodiments are given as an example and not as a limitation unless specifically described otherwise. The sizes and the positional relationships of the members in each of the drawings are occasionally shown exaggerated for ease of explanation. Further, in the description below, the same designations or the same reference numerals denote the same or like members and duplicative descriptions will be appropriately omitted. The constituent elements, embodiments, and examples can be applied in combination, with changes, and/or with modifications, unless specifically excluded in the description.

Embodiment 1

Figure 2A:
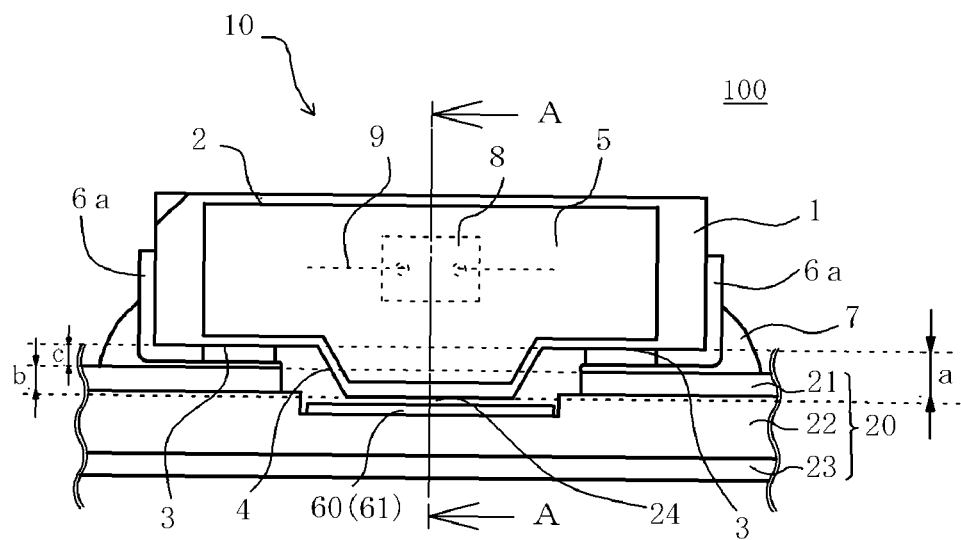
FIG. 2A is a schematic front view of a light emitting device mounting structural body according to an embodiment of the present invention.
Figure 2B:
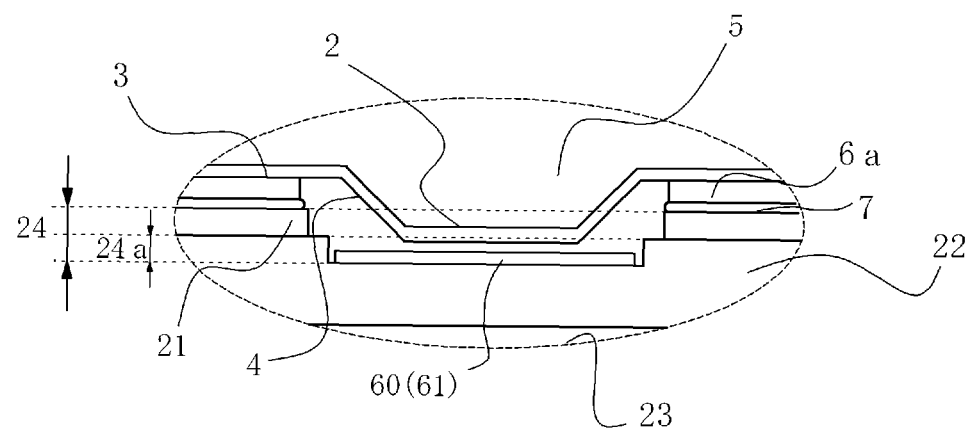
FIG. 2B is a partially enlarged view of a portion in the vicinity of a wiring substrate and a projected portion shown in FIG. 2A.
Figure 3:
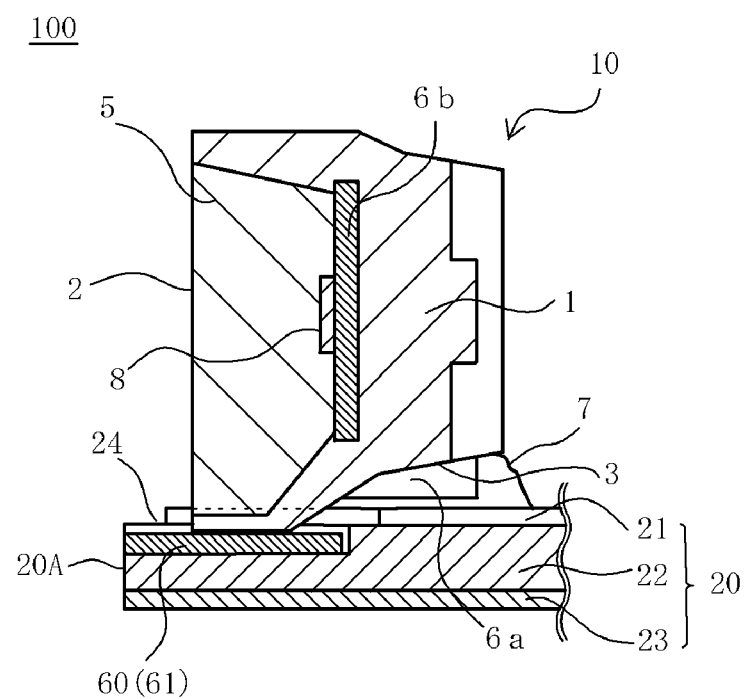
FIG. 3 is a schematic cross sectional view taken along line A-A of FIG. 2A.

FIG. 1 is a schematic perspective view of a light emitting device mounting structural body 100 according to Embodiment 1 of the present invention. FIG. 2A is a schematic front view of a light emitting device mounting structural body and FIG. 2B is a partially enlarged view of a portion in the vicinity of a wiring substrate and a projected portion shown in FIG. 2A. FIG. 3 is a schematic cross sectional view taken along line A-A of FIG. 2A. The light emitting device mounting structural body 100 includes a light emitting device 10 mounted on a wiring substrate 20.

The wiring substrate 20 includes a pair of wiring portions 21 on an upper surface of a base member 22 and defines a recess 24 in the upper surface (of the wiring substrate 20). The recess 24 of Embodiment 1 includes a groove portion 24a defined in an upper surface of the base member 22 and a portion defined by the wiring 21. Also, the recess 24 is defined at a periphery of the wiring substrate 20.

The resin molded body 1 serves as a package of the light emitting device 10 and is integrally formed with a pair of lead frames 6. The lower surface of the resin molded body 1 includes an arrangement portion 3 under which a pair of outer leads 6a which are respectively a part of the lead frames 6 led out from the package are arranged, and a projecting portion 4 projecting further downward relative to the arrangement portion 3. The projecting portion 4 is projected further downward relative to the lower surface of the outer lead 6a. Further, a side surface of the resin molded body 1 has an opening 2. The opening 2 is formed in the resin molded body 1 from a location higher than at least the arrangement portion 3 to a location in the projecting portion, and formed to a location that is lower than the lower surface of the outer lead 6a. A light emitting element 8 is mounted on a bottom surface (i.e. on the inner lead 6b in FIG. 3) of the opening 2.

The light emitting element 8 is electrically connected to the inner lead 6b via a wire 9. Further, a sealing member 5 is filled in the opening 2 to cover the light emitting element 8. The surface of the sealing member 5 becomes a main light emitting surface of the light emitting device 10. A fluorescent material to be excited by the light from the light emitting element 8 is contained in the sealing member 5.

The outer leads 6a are respectively electrically connected to the pair of wirings 21 of the wiring substrate 20 via an electrically conductive adhesive member 7 such as a solder. Thus, the light emitting device mounting structural body 100 is constituted. The wirings 21 are arranged outer side with respect to the groove portion 24a of the base member. With this arrangement, a part of the upper surface of the base member 22 is exposed, so that the wirings 21 hardly come off the base member, and thus a reduction in the bonding strength can be avoided. Further, the adhesive member 7 is hardly disposed in the groove portion 24a, so that the adhesive member 7 and the projecting portion 4 can be prevented from coming into contact with each other. As illustrated above, in the case where the wirings 21 are arranged outer side with respect to the groove 24a, the recess 24 is defined by a portion of the base member 22 defining the groove portion 24a, a portion of the upper surface of the base member 22, and an end portion of the wirings 21. Moreover, in the case where the adhesive member 7 is disposed to cover the end portion of the wirings 21, the recess 24 is substantially defined by a portion of the base member 22 defining the groove portion 24a, a portion of the upper surface of the base member 22, and the portions of the adhesive member 7, but the adhesive member 7 is assumed to be excluded from the structure defining the recess 24.

In the embodiment, at least a portion of the projecting portion 4 of the resin molded body 1 of the light emitting device 10 is housed in the recess 24 of the wiring substrate 20. Further, the portion of the opening in the projecting portion 4 is also housed in the recess 24 of the wiring substrate 20. That is, the bottom surface defining the opening 2 (the lowermost surface of the inner walls of the resin molded body 1 defining the opening 2) is located lower than the upper surface of the wirings 21 (i.e. the opening plane of the recess 24). In the present embodiment, the light-reflecting member 60 is arranged on the bottom surface of the recess 24.

With the light emitting device mounting structural body 100, the projecting portion 4 (that is, the opening 2) can be expanded downward without reducing mounting properties of the light emitting device 10 and the wiring substrate 20. Also, the expanded projecting portion 4 and the opening 2 are housed in the recess 24, so that a thin structure of the light emitting device mounting structural body 100 can be maintained. Moreover, the light emitted from the opening 2 of the light emitting device 10 can be efficiently emitted without being obstructed by the wiring substrate 20.

Each constituent of the light emitting device mounting structural body according to the embodiments will be described in detail below. In the description below, the term "depth direction" indicates a direction perpendicular to the front surface (light emitting surface) and to the back surface of the light emitting device 10, the term "width direction" indicates a direction perpendicular to a side surface of the light emitting device 10 (in the present embodiment, a longitudinal direction of the resin molded body 1), and the term "height direction" indicates a direction perpendicular to the upper surface and the lower surface of the light emitting device 10 (in the present embodiment, a lateral direction of the resin molded body 1).

Wiring Substrate

The wiring substrate 20 of Embodiment 1 at least includes wirings 21 which are respectively electrically connected to the light emitting device 10, and a base member 22 for supporting the wirings 21. A recess 24 is defined in the upper surface of the wiring substrate 20. The recess 24 of Embodiment 1 may be defined by a portion of the base member 22 defining a groove 24a and a portion of the wirings 21. Accordingly, the depth of the recess 24 is a total of the thickness of the wiring 21 and the depth of the groove portion 24a. Such a recess 24 can be formed deeper than the recess defined by the base member which has an upper surface substantially in a single plane (i.e. without having a groove portion) and the wirings disposed on the upper surface. Accordingly, the projecting portion 4 (opening) can be easily expanded downward.

The recess 24 is defined in a periphery of the wiring substrate 20. In detail, the recess 24 of the present embodiment has a shape of a cut-out defined in the wiring substrate 20. That is, the inner wall defining the recess 24 (i.e. end portion of the wirings 21 and inner wall defining the groove portion 24a) is not formed in the light emitting direction of the light emitting device 10 mounted in the recess. Accordingly, the light emitted from the light emitting device 10 can be emitted without being obstructed. Also, as shown in FIG. 3, in the present embodiment, the light emitting surface (opening plane of the resin molded body 1) of the light emitting device 10 is arranged inner side with respect to the end surface 20A of the wiring substrate 20. That is, a portion of the wiring substrate 20 defining the recess 24 is extended forward of the light emitting surface of the light emitting device 10.

The wiring substrate 20 may be provided with a constituent layer in addition to the wirings 21 and the base member 22. Particularly, as the constituent layer, a light-reflecting member 60 is preferably disposed in the recess 24. The light-reflecting member 60 according to Embodiment 1 is disposed in the vicinity of the bottom surface of the recess 24 of the wiring substrate 20. The light-reflecting member 60 will be described below.

The wiring substrate 20 according to Embodiment 1 may either be rigid or flexible. A rigid wiring substrate 20 may preferably have a thickness of about 0.3 mm to about 0.5 mm. Also, a flexible wiring substrate 20 such as FPC may have a thickness of about 0.1 mm to about 0.2 mm. As described above, a flexible wiring substrate (FPC) can be thinner than a rigid wiring substrate and the base member used in the flexible wiring substrate can also be very thin. For this reason, formation of a groove portion in the base member is relatively difficult, so that the recess of a flexible wiring substrate is preferably defined by a portion of the base member whose upper surface is approximately in a single plane (i.e. does not include a groove portion) and a portion of the wirings.

Base Member

The base member 22 preferably has an insulating property, but an electrically conductive base member may be used for the base member, provided that the electrically conductive base member is insulated from the wirings with an insulating layer etc. Examples of the base material of the base member 22 include aluminum oxide, aluminum nitride, zirconium oxide, zirconium nitride, titanium oxide, titanium nitride, or a ceramics containing a mixture of those, a metal such as copper, iron, nickel, chromium, aluminum, silver, gold, titanium, or an alloy of those metals, a resin such as an epoxy resin, a BT resin, a polyimide resin, or a fiber reinforced resin of those resin (a reinforcing material is glass, alumina, or the like). In order to efficiently reflect light from the light emitting element 8, a light-reflecting material such as titanium oxide is preferably included in the resin used as the base material. The base member 22 according to Embodiment 1 can have a thickness of about 0.2 mm to about 0.3 mm.

The groove portion 24a which is a constituent portion of the recess 24 is formed in a periphery of the base member 22. The groove portion 24a can be formed by polishing with a jig, or disposing a mask on portions other than the portion for the groove portion and performing etching or cutting. The groove portion 24a can also be formed by stacking the layers each having a through hole in a periphery thereof, on a layer having approximately flat upper surface. The depth of the groove portion 24a may be preferably about 0.15 mm to about 0.2 mm, in the case where the base member has a thickness of about 0.2 mm to about 0.3 mm as in Embodiment 1 (about 30 to about 80% with respect to the thickness of the base member 22). The groove portion 24a is preferably formed with a width which can house at least the projecting portion 4 of the light emitting device 10, and with the width which is smaller than the width of the pair of outer leads of the arrangement portion 3 of the light emitting device 10.

Figure 6A:
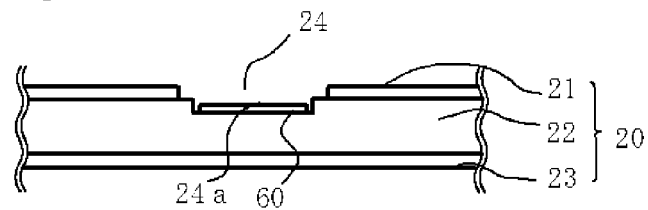
FIG. 6A is a schematic cross-sectional view of a wiring substrate of a light emitting device mounting structural body according to an embodiment of the present invention.
Figure 6B:
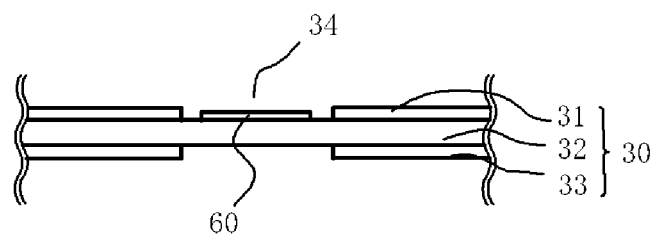
FIG. 6B is a schematic view of a wiring substrate of a light emitting device mounting structural body according to an embodiment of the present invention.
Figure 6C:
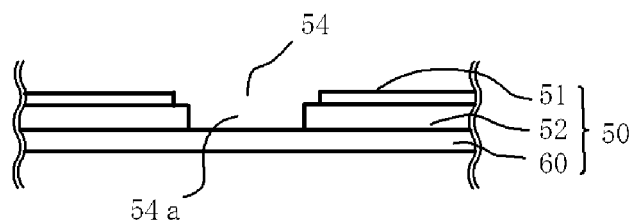
FIG. 6C is a schematic view of a wiring substrate of a light emitting device mounting structural body according to an embodiment of the present invention.
Figure 6D:
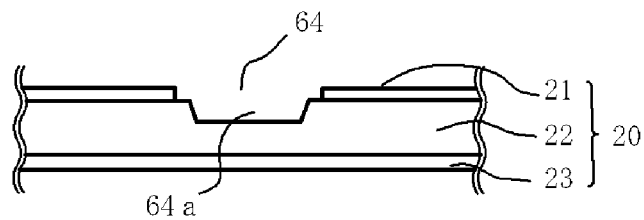
FIG. 6D is a schematic view of a wiring substrate of a light emitting device mounting structural body according to an embodiment of the present invention.
Figure 6E:
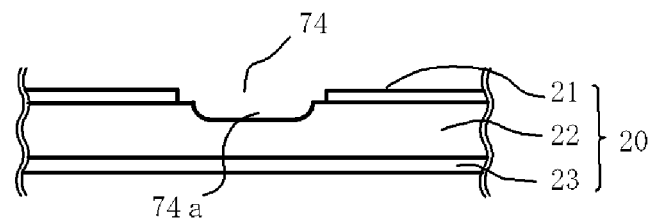
FIG. 6E is a schematic view of a wiring substrate of a light emitting device mounting structural body according to an embodiment of the present invention.

The shape of the groove portion 24a may be, as the groove portion 24a shown in FIG. 2B, an approximately rectangular shape in a front view, or a tapered shape widening upward in a front view as the groove portion 64a shown in FIG. 6D, or a shape with rounded corners in a front view as the groove portion 74a shown in FIG. 6E. The light-reflecting efficiency can be improved particularly with the groove portion 64a with an upwardly widening tapered shape. Other than the tapered shape in a front view, the groove portion may be formed with an upwardly widening shape with a step difference in the inner wall defining the groove portion.

Figure 7:
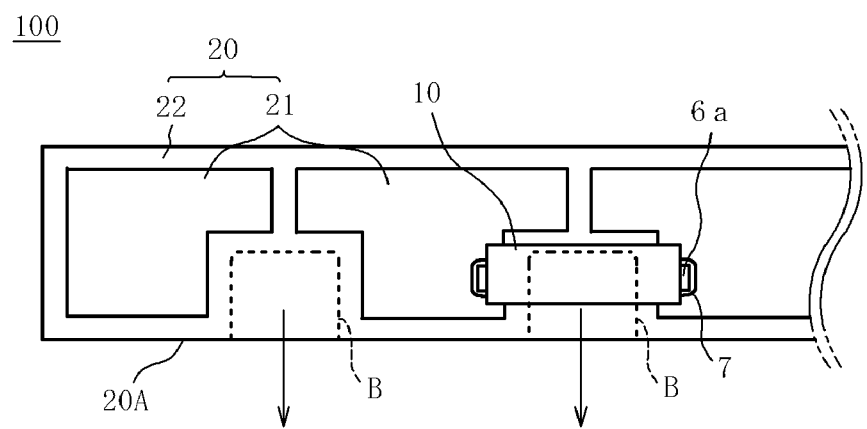
FIG. 7 is a schematic plan view illustrating an operation in manufacturing a light emitting device mounting structural body according to an embodiment of the present invention.

Also, as shown in FIG. 6C, the groove portion 54a may be formed penetrating through the base member 52 in the thickness direction of the base member 52. With this arrangement, a penetrating recess 54 can be formed. The depth of the penetrating recess 54 can be easily adjusted by adjusting the thickness of the wirings 51 and the base member 52. As described above, the penetrating recess 54 is deep and easily formed, which can facilitate downward expansion of the projecting portion (opening). The penetrating groove portion 54a can be formed by punching etc. Also, the groove portion 24a is formed at a periphery of the wiring substrate 20, so that, as shown in FIG. 7, the groove portion 24a can be easily formed by applying laser beam etc., on the base member 22 to form a cutting line of a dotted line etc., and applying tensile stress as shown in arrows in FIG. 7 on the base member 22.

The depth of the recess 24 is appropriately adjusted according to a thickness relationship with other constituent members (projecting portion 4, light-reflecting member 60 (reflecting sheet 61) to be described below, outer lead 6a of arrangement portion 3, wirings 21, adhesive member 7 between the outer leads 6a, and the like). The depth of the recess 24 may be about 10% to about 60% with respect to the thickness of the wiring substrate 20. For example, in Embodiment 1, in the case where a rigid wiring substrate 20 having a base member 22 with a thickness of about 0.2 mm to about 0.3 mm is used, a recess 24 with a depth of about 0.17 mm to about 0.27 mm can be formed.

Wiring

The wirings 21 are disposed at least on an upper surface of the base member 22 and electrically connected to the outer leads 6a of the light emitting device 10, respectively. Examples of the material of the wiring 21 includes Cu, Ni, Pd, W, Cr, Ti, Al, Ag, Au and an alloy of those metals, and in view of heat dissipation, Cu or a copper alloy is particularly preferable. On the surface of the wirings 21, a film of Ag, Pt, Sn, Au, Cu, Rd, or an alloy of those metals, silver oxide, or an oxide of silver alloy may be formed. Particularly, in view of mounting properties, plating such as Au or a solder or flux treatment is preferably applied on the portion to be connected to the light emitting device 10. The wirings 21 can be formed by plating, vapor deposition, sputtering, printing, coating, or the like. The wiring 21 may be adhered to the base member 22 with an adhesive agent, and an insulating adhesive agent such as an epoxy resin, a silicone resin, a polyimide resin, or a hybrid resin of those resins can be preferably used. The wirings 21 may have a thickness of about 18 μm to about 70 μm.

The shape and/or position of the wirings 21 is not specifically limited as long as the wirings 21 are formed at locations which allows connection with the outer leads 6a of the light emitting device 10. The pair of positive and negative wirings 21 are preferably formed at about 0.2 mm to about 0.3 mm outer sides from the groove portion 24a. Also, the wirings 21 are preferably formed about 0.3 mm to about 0.4 mm or more spaced apart from the end surfaces 20A of the wiring substrate 20 respectively. With this arrangement, occurrence of short circuit can be prevented in the case where an electrically conductive member is disposed at a periphery, and thus preferable. Further, in the case where a circuit etc., for transmitting electrical signals is provided, malfunction due to noise or the like can be prevented. The width between a pair of wirings 21 is arranged larger than the longitudinal width of the projecting portion 4 so that the projecting portion 4 of the light emitting device 10 can be housed. Also, the width between the pair of wirings 21 is preferably arranged smaller than the width between the pair of outer leads 6a at the arrangement portion 3 of the light emitting device 10.

Constituent Layer

As described above, a constituent layer 23 may also be stacked on the wiring substrate 20 in addition to the wirings 21 and the base member 22. Examples of the constituent layer 23 include back-surface wirings which are formed on the lower surface of the base member 22 and connected to the wirings 21 of the upper surface through via holes respectively, and the light-reflecting member 60. Other appropriate layers can also be formed as a constituent layer 23. The light-reflecting member 60 which is an example of the constituent layer 23 will be described in detail below.

Light-Reflecting Member

Generally for the base member 22 of the flexible wiring substrate 20 (EPC etc.), a polyimide film or the like, having a brown color and a low reflectance, which easily absorbs emission light from the light emitting element 8, is often used. A base member 22 of a rigid wiring substrate 20 made of glass epoxy etc., also absorbs considerable amount of emission of the light emitting element 8. In order to suppress such absorption of light, a light-reflecting member 60 may be arranged in the recess 24, which may be improve the light extraction from the light emitting device 10. Further, compared to the case where a base member of brown color is exposed, the color tone of emission can be improved with the light-reflecting member 60. Also, a material of white color may be used for the base member 22 to suppress such optical absorption, which can improve extraction of light of the light emitting device 10.

FIGS. 6A to 6E are respectively a schematic cross-sectional view of a wiring substrate according to an embodiment of the present invention. An example of wiring substrate having a groove portion in a different shape as in Embodiment 1 is shown in FIG. 6D and FIG. 6E, as described above. FIG. 6A shows a wiring substrate 20 having a recess 24 defined by a portion of the wirings 21 and a portion of the base member defining the groove portion 24a. FIG. 6B shows a wiring substrate 30 having a recess 34 defined by a portion of the base member 32 whose upper surface is approximately on a single plane and a portion of the wirings 31.

A constituent layer of a light-reflecting member 60 is arranged on the wiring substrates shown in FIG. 6A to FIG. 6C, respectively. The constituent layers 23, 33 shown in FIG. 6A and FIG. 6B may either be a light-reflecting member or a back-surface wiring, but the constituent layers 23, 33 are not specifically limited. The light-reflecting member 60 can be formed in the recess by using, for example, a white resist or a white ink. More specifically, the light-reflecting member 60 can be formed by printing or coating. Also, a reflecting sheet 61, which is a constituent member of a lighting device to which the light emitting device mounting structural body 100 to be installed, can be arranged as the light-reflecting member 60.

Figure 8:
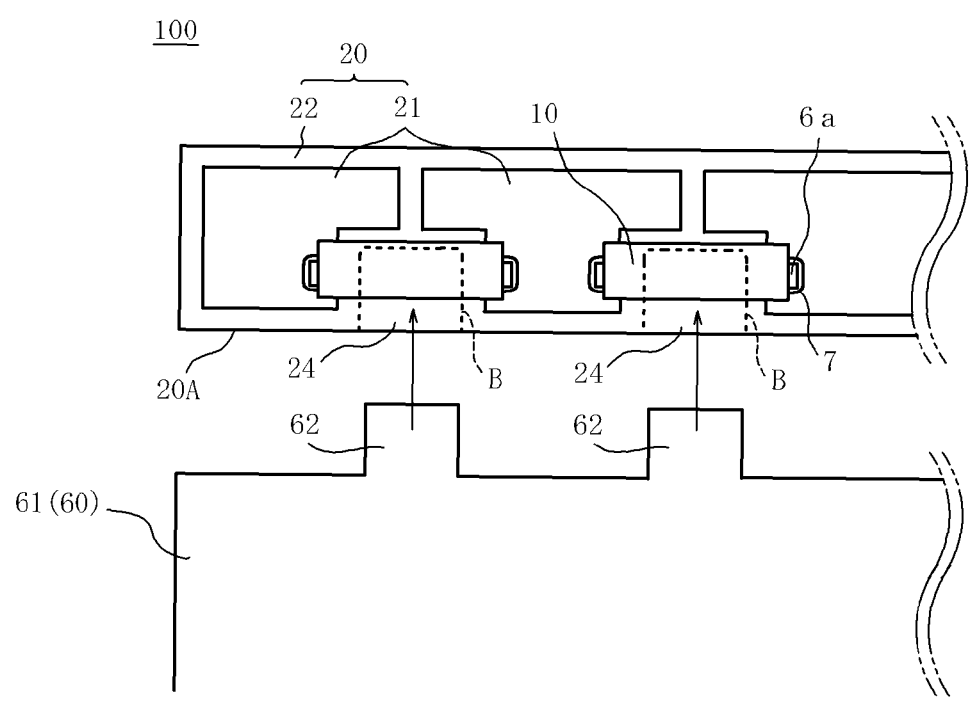
FIG. 8 is a schematic plan view illustrating an operation in manufacturing a light emitting device mounting structural body according to an embodiment of the present invention.

For example, in a top view as shown in FIG. 8, the reflecting sheet 61 can be provide with projecting portions 62 which are in conformity to the width and depth of the recesses 24 of the wiring substrate 20. The projecting portions 62 are formed on a periphery (side surface) of the reflecting sheet 61. The reflecting sheet 61 is disposed by inserting the projecting portions 62 in the recesses 24 of the wiring substrate 20. Also, as shown in FIG. 6C, the light-reflecting member 60 may be disposed under the base member 52 which is provided with penetrating groove portions 54a. The wiring substrate 50 provided with the penetrating recesses 54 allows light to pass through especially downward, so that a constituent layer of a light-reflecting member 60 is preferably disposed. In the case where a reflecting sheet 61 is used as the light-reflecting member 60, the reflecting sheet 61 can be disposed after mounting the light emitting device 10 on the wiring substrate 20.

In addition, the light-reflecting member 60 may be disposed in the recesses 24 of the wiring substrate 20 by using a white resist or a white ink, and a reflecting sheet 61 (60) may further be disposed in the recesses 24. With this arrangement, light of the light emitting device 10 can be reflected more efficiently.

The light-reflecting member 60 can be disposed on an appropriate position on the surface defining the recess, such as a position on or near the bottom surface of the recess, as shown in FIG. 6A to FIG. 6C, respectively. Also, the light-reflecting member 60 is preferably formed in a wide area in the recess. More specifically, it is preferable that approximately whole area of the bottom surface of the recess is covered with the light-reflecting member 60. Further, it is also preferable that the side surfaces of the recess (inner side walls defining the groove portion) are also covered. For example, in the case where approximately 70% of the surfaces defining the recess is covered with the light-reflecting member 60, the light extraction efficiency can be improved. Particularly, in the case where the portion defining the recess is extended further forward relative to the light emitting surface (opening plane of the opening 2) of the light emitting device, disposing the light-reflecting member 60 on the bottom surface of the recess allows the light emitted downward from the opening of the light emitting device to be efficiently reflected upward (in a direction toward the light guide member to be described below).

Examples of the material of the light-reflecting member 60 include a resin material as a base material which is mixed with a light-reflecting material. For the base material, an insulating resin composition containing a silicone resin, an epoxy resin, or an acrylic resin is preferably used. For the light-reflecting material, for example, at least one selected from $TiO_2$, $ZrO_2$, $Nb_2O_5$, $Al_2O_3$, MgF, MN, and $SiO_2$ can be used. For the reflecting sheet 61, for example, polyethylene terephthalate (PET) containing barium titanate or the like can be used.

The light-reflecting member 60 (reflecting sheet 61) disposed in the recess is formed so as not to contact with at least the projecting portion 4. It means that the light-reflecting member 60 is formed with a thickness smaller than the total dimension of the depth of the recess 24, the thickness of the outer leads 6a of the arrangement portion 3, and the thickness of the adhesive member 7 between the wirings 21 and the outer leads 6a. Further, the thickness of the light-reflecting member 60 is preferably adjusted by the depth of the recess 24 and the thickness of the projecting portion 4 in height direction, so that the projecting portion 4 of the light emitting device 10 can be housed in the recess 24. That is, the light-reflecting member is preferably formed with a thickness smaller than a distance between the lower surface of the projecting portion 4 and the bottom surface defining the recess 24. For example, the light-reflecting member 60 according to Embodiment 1 may have a thickness of about 0.1 mm to about 0.2 mm.

Light Emitting Device

The light emitting device 10 according to the present embodiment is a side-emission type (side-view type) light emitting diode, and includes, at least, a resin molded body 1, a pair of positive and negative lead frames 6, a light emitting element 8, and a sealing member 5.

Resin Molded Body

The resin molded body 1 serves as a package of the light emitting device 10 and is integrally formed with a pair of lead frames 6. The lower surface of the resin molded body 1 includes an arrangement portion 3 under which a pair of outer leads 6a which are respectively a part of lead frames 6 led out from the package are arranged, and a projecting portion 4 projecting further downward relative to the arrangement portion 3. The arrangement portion 3 is arranged at the longitudinal both ends of the lower surface of the resin molded body 1, and the projecting portion 4 is formed therebetween. At least a portion of the projecting portion 4 is housed in the recess 24 of the wiring substrate 20. That is, the lower surface of the projecting portion 4 is arranged lower than the upper surface of the pair of positive and negative wirings 21. Further, a side surface of the resin molded body 1 has an opening 2 for mounting a light emitting element 8, and the opening 2 is extended to the projecting portion 4. A portion of the opening 2 extended to the projecting portion 4 is housed in the recess 24. That is, the lower surface defining the opening 2 (the lowermost surface of the inner walls of the resin molded body 1 defining the opening 2) is located lower than the upper surface of the wirings 21. In Embodiment 1, the lower surface of the opening 2 of the light emitting device 10 is located below the upper surface of the wiring 21 and at a height equal or higher than the opening plane of the groove portion 24a. Accordingly, the emission region can be increased in a downward direction of the light emitting device 10.

At least a part of the projecting portion 4 is housed in the recess 24, so that the thickness "a" of the projecting portion 4 in height direction (i.e. a thickness between the lower surface of the arrangement portion 3 and the lower surface of the projecting portion 4), is greater than a total thickness "c" of a thickness of the outer lead 6a at the arrangement portion 3 and a thickness of the adhesive member 7 adhering applied between the wiring 21 and the outer lead 6a. Also, the thickness of the projecting portion 4 in height direction is not greater than a total thickness of a thickness of the outer lead 6a at the arrangement portion 3, a thickness of the adhesive member 7 adhering applied between the wiring 21 and the outer lead 6a, and a depth of the recess 24 of the wiring substrate 20 (in the case where the light-reflecting member 60 is disposed in the recess 24, the thickness of the light-reflecting member 60 is to be subtracted from the thickness "a"). In Embodiment 1, the thickness "a" of the projecting portion 4 in height direction is, for example, preferably about 30% to about 70% with respect to the thickness from the upper surface of the resin molded body 1 to the lower surface of the arrangement portion 3, and about 0.2 mm to about 0.4 mm can be employed.

The thickness "b" of the projecting portion 4 in height direction housed in the recess 24 is preferably approximate to or greater than the thickness of the wiring, which allows effective enlargement of the opening 2. In Embodiment 1, for example, the thickness of the base member 4 to be housed in the recess 24 can be about 0.1 mm to about 0.5 mm or greater. Further, the thickness of the opening 2 housed in the recess 24 can be about 0.04 mm to about 0.4 mm. Also, the thickness of the projecting portion 4 to be housed in the groove portion 24a can be about 0.02 mm to about 0.3 mm. In Embodiment 1, the opening 2 is arranged higher than the opening plane of the groove portion 24a. In this case, for example, compared to the case in which the opening 2 is not housed in the recess 24 of the wiring substrate 20 (that is, the lower surface of the opening 2 (a surface at the lowest side among the inner walls of the resin molded body 1 which defines the opening 2) is arranged on approximately the same plane as the upper surface of the pair of positive and negative wirings 21), the opening 2 can be expanded by about 5% and which can improve the luminous flux of the light emitting device by about 1 to 3%. That is, the luminance of the lighting device which employs the light emitting device mounting structural body mounted with the light emitting device 10 can be improved by about 1% to about 3%.

Figure 9A:
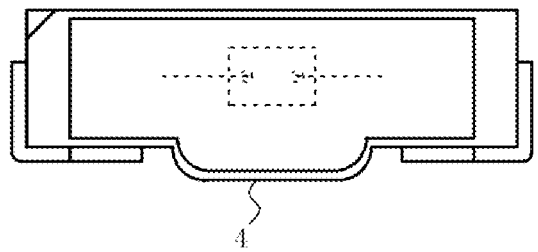
FIG. 9A is a schematic front view of a light emitting device according to an embodiment of the present invention.
Figure 9B:
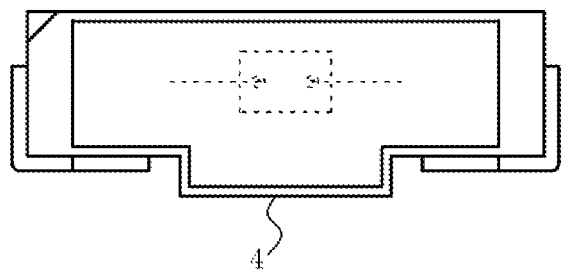
FIG. 9B is a schematic front view of a light emitting device according to an embodiment of the present invention.

The resin molded body 1 according to Embodiment 1 has an approximately T-shape in a front (opening side) view. In the case where the projecting portion 4 has a shape narrowing downward, contact of the wiring substrate 20 with a side wall defining the recess 24 of the wiring substrate 20 can be sufficiently avoided. The opening 2 can be made in an approximately T-shape which is slightly smaller than the resin molded body 1 and the opening 2 of the projecting portion 4 can be defined in a shape narrowing downward as in the same manner as the projecting portion 4. The shapes of the resin molded body 1 and the opening 2 are not limited thereto, and the shape of the resin molded body 1 and the shape of the opening 2 are not necessarily in conformity with each other. For example, as the light emitting device 13 shown in FIG. 9B, the projecting portion 4 having a rectangular shape in front view, or as the light emitting device 12 shown in FIG. 9A, a projecting portion 4 with a rounded shape, an appropriate shape can be employed. In the case where the projecting portion 4 has a rounded shape as shown in FIG. 9A, the amount of the resin to be used can be reduced compared to the case where the projecting portion 4 has corners. Moreover, a good resin flow can be formed and the moldability of the resin can be improved with the rounded shape.

The resin molded body 1 can be molded with a resin etc., as a base material and by using injection molding, insert molding, extrusion molding, transfer molding, or the like. Examples of the material of the thermoplastic resin include an aliphatic polyamide resin, a half aromatic polyamide resin, polyethylene terephthalate, polycyclohexene terephthalate, a liquid crystal polymer, a polycarbonate resin, a syndiotactic polystyrene, a polyphenylene ether, a polyphenylene sulfide, a polyether sulfone resin, a polyether ketone resin, and a polyarylate resin. Examples of the material of the thermosetting resin include an epoxy resin, a polyurethane resin, and a polybismaleimide triazine resin. In addition, the base materials described above can contain particles or fibers of, for example, glass, silica, titanium oxide, magnesium oxide, carbonate magnesium, magnesium hydroxide, calcium carbonate, calcium hydroxide, calcium silicate, magnesium silicate, wallastonite, mica, zinc oxide, barium titanate, potassium titanate, aluminum borate, aluminum oxide, silicon carbide, antimony oxide, zinc stannate, zinc borate, iron oxide, chromium oxide, manganese oxide, carbon black, as a filler or a color pigment.

Lead Frame

The lead frame 6 is formed in an integral manner with the resin molded body 1, and is constituted with an outer lead 6a led out from the resin molded body 1 and an inner lead 6b surrounded by the resin molded body 1. The outer lead 6a is arranged with bent shape along the lower surface of the arrangement portion 3 which is located on a lower surface of the resin molded body 1. The outer lead 6a at the arrangement portion 3 and the wiring 21 are bonded. Thus the light emitting device 10 can be electrically connected to the wiring substrate 20. A light emitting element 8 is mounted on the inner lead 6b which is exposed at a bottom surface of the opening 2 which is approximately perpendicular to the lower surface of the resin molded body 1. It is preferable that the thickness of the lead frame 6 is about 0.1 mm to about 0.2 mm.

Examples of the base material of the lead frame 6 include Cu, Fe, Ni, Pd, W, Cr, Al, Ag, Au, Ti, or an alloy of those. Particularly, in view of heat dissipation, Cu or a copper alloy is preferable and in view of bonding reliability with the light emitting element, iron or an iron alloy is preferable. Particularly, copper or an iron-copper has high heat dissipation efficiency and thus preferable. The lead frame 6 can be formed by applying pressing or etching on a metal plate made of such a material. On the surface of the lead frame 6, Ag, Ni, Pd, Pt, Sn, Au, Cu, Rd, or an alloy of those metals may be disposed. It is particularly preferable that the surface of a portion to be connected to the light emitting element 8 is coated with Ag. Those coatings can be formed by plating, vapor deposition, sputtering, printing, coating, or the like.

Light Emitting Element

For the light emitting element 8, a semiconductor light emitting element such as an LED can be used. With the use of an adhesive agent etc., the light emitting element 8 is mounted on one of the inner lead 6b exposed on the bottom surface of the opening 2. The shape of the mounting surface is not specifically limited and a rectangular shape, a polygonal shape, a circular shape, an elliptical shape, or the like, can be employed. The light emitting element 8 has an element structure constituted with a various semiconductors and a pair of positive and negative electrodes disposed on the element structure. The element structure is constituted with at least a first conductive-type (n-type) layer and a second conductive-type (p-type) layer, and an active layer is preferably provided therebetween. In the case where a pair of positive and negative electrodes are disposed on the same surface side, the electrodes may be connected to the inner leads 6b via the wires 9, respectively, or may be mounted in a flip-chip manner in which the electrodes and the inner leads 6b are respectively connected via an electrically conductive adhesive agent. In addition, a metal layer or a reflecting layer made of Ag, Al, or the like can be disposed on the mounting surface side of the light emitting element 8, which allows an improve in the light extraction efficiency.

The light emitting element 8 of an appropriate wavelength can be selected according to the application. In order to obtain light of a mixed color with a wavelength converted light emitted from a fluorescent material, a light emitting element for emitting a visible light is preferably employed. For example, a light emitting element for emitting light of a blue color (emission wavelength of 430 nm to 490 nm) or a green color (emission wavelength of 490 nm to 570 nm), a nitride-based semiconductor ($In_XAl_YGa_{1-X-Y}N$, $0 \leq X$, $0 \leq Y$, $X+Y \leq 1$) etc., can be used. For a light emitting element for emitting light of a red color (emission wavelength of 620 nm to 750 nm), GaAlAs, AlInGaP, etc., can be used.

The outer shape of the light emitting element 8 is not specifically limited. According to the present embodiment, the recesses 24 of the wiring substrate 20 allow expansion of the projecting portion 4 and opening 2. Thus, light emitting elements of larger size than that of generally employed, or a plurality of light emitting elements become possible to be mounted. Accordingly, the brightness of the light emitting device 10 can be improved. Moreover, a plurality of light emitting elements having different emission colors (for example, light emitting elements of red, green, blue emissions) can be mounted, so that the color reproduction range of the emission color can be expanded. The plurality of light emitting elements can be connected either in series or in parallel. The position of the light emitting element 8 in height direction (for example in the lateral direction of the light emitting device) on the element mounting surface (inner lead 6a) may either be approximately at center or deviated. For example, disposing the light emitting elements 8 with upward deviation allows for a larger space beneath the light emitting elements 8, so that an increased amount of a fluorescent material may be applied. With the arrangement as described above, while obtaining wavelength converted light by the downward light emitted from the light emitting element 8, the upward light emitted from the light emitting element 8 can be efficiently extracted to outside of the light emitting device 10, with suppressing the optical loss caused by the fluorescent material.

Sealing Member

The sealing member 5 is for at least covering the light emitting element to protect the light emitting element 8 from dust, moisture, external force, or the like. The base material of the sealing member 5 is insulating and allows emission from the light emitting element 8 to pass through. More specifically, for example, a silicone resin, an epoxy resin, a phenol resin, a polycarbonate resin, an acrylic resin, a TPX resin, a polynorbornene resin, or a hybrid resin which contains one or more of those resins are used, and also, a glass may be used. Particularly, a silicone resin which has high heat-resisting property and high light-resisting property is preferable. Particles with various functions such as filler particles or fluorescent material particles may be added in the base material of the sealing member 5. For the filler, a diffusion agent, a coloring agent, and the like, can be used. Specific examples thereof include silica, titanium oxide, magnesium oxide, carbonate magnesium, magnesium hydroxide, calcium carbonate, calcium hydroxide, calcium silicate, zinc oxide, barium titanate, aluminum oxide, iron oxide, chromium oxide, manganese oxide, glass, and carbon black. The sealing member 5 may be constituted with a plurality of layers, but reflection of light or detachment can be suppressed in a sealing member constituted with a single layer, and therefore preferable.

The sealing member 5 preferably contains a fluorescent material for converting wavelength of at least a part of emitted light from a light emitting element 8, so that the emitting light of the light emitting device 10 can be adjusted to a desired color. Examples of fluorescent material include nitride-based fluorescent materials and oxynitride-based fluorescent materials, which are activated mainly with a lanthanoid element such as europium, cerium, more specifically, α-, or β-sialon fluorescent materials and various types of alkaline-earth metal nitride silicate fluorescent materials, which are activated with europium, alkaline-earth metal halogen apatite fluorescent materials, alkaline-earth metal halosilicate fluorescent materials, alkaline-earth metal silicate fluorescent materials, alkaline-earth metal haloborate fluorescent materials, alkaline-earth metal aluminate fluorescent materials, alkaline-earth metal silicates, alkaline-earth metal sulfides, alkaline-earth metal thiogallates, and alkaline-earth metal silicon nitrides or germanates, which are activated mainly with a lanthanoid element such as europium or a transition metal element such as manganese, rare-earth aluminates and rare-earth silicates, which are activated mainly with a lanthanoid element such as cerium, organic compounds and organic complexes which are activated mainly with a lanthanoid element such as europium. In addition, KSF etc., which is a red fluorescent material, can also be used. Fluorescent materials other than those described above, having similar properties, performance, and effects can also be used. Accordingly, a light emitting device to emit light of mixed color having a visible wavelength (for example, a while light) of primary light and secondary light, or a light emitting device to emit secondary light having a visible wavelength upon being excited by primary light in the ultraviolet region can be obtained. The fluorescent material can be contained not only in the sealing member but also in other constituent members, or appropriately disposed, for example, between the constituent members.

Wire

The wires 9 are for electrically connecting the electrodes of the light emitting element 8 and the inner leads 6b respectively. For the wires 9, a metal wire made of Au, Cu, Ag, Pt, Al, or an alloy of those metals can be used. Particularly, Au, with which breakage due to stress from the sealing member 5 hardly occurs and which has good heat-resistance, is preferable. In order to increase the light extraction efficiency, at least the surface of the wires 9 is preferably made of Ag.

Adhesive Member

The adhesive member 7 is disposed between the outer lead 6a of the arrangement portion 3 and the wiring 21 of the wiring substrate 20 to electrically connect the both members. Examples of the material of the adhesive member 7 include an electrically conductive paste which is made of Ag, Au, Pd or the like, and an electrically conductive material such as a solder such as tin-bismuth-based solder, tin-silver-based solder, gold-tin-based solder, or the like, and a brazing material made of a low-melting-point metal. Particularly, the adhesive member 7 is preferably an alloy such as a solder material. With the amount of the adhesive member 7, the position of the lower surface of the projecting portion 4 (opening 2) housed in the recess 24 in the height direction can be adjusted.

Examples of the adhesive agent for bonding the light emitting element 8 and the inner lead 6b include insulating adhesive agents such as an epoxy resin, a silicone resin, a polyimide resin, a modified resin of those or a hybrid resin of those resins.

Protective Element

In order to prevent destruction of the light emitting element 8 caused by over-voltage, a protective element such as a Zener diode and/or a capacitor may be mounted in the light emitting device 10.

Underfill

The underfill is for protecting the light emitting element 8 etc., from an external stress and deterioration due to corrosion or the like. For example, an underfill can be impregnated to a portion under the light emitting element 8 after the light emitting element 8 is mounted on the inner lead 6b in a flip-chip manner. For the material of the underfill, a similar material as the base material of the sealing member 5 described above can be used, and with the use of a white resin such as a silicone resin which contains particles of titanium oxide, emission from the light emitting element 8 can be prevented from leaking out to the inner lead 6b side.

Lighting Device

Figure 4:
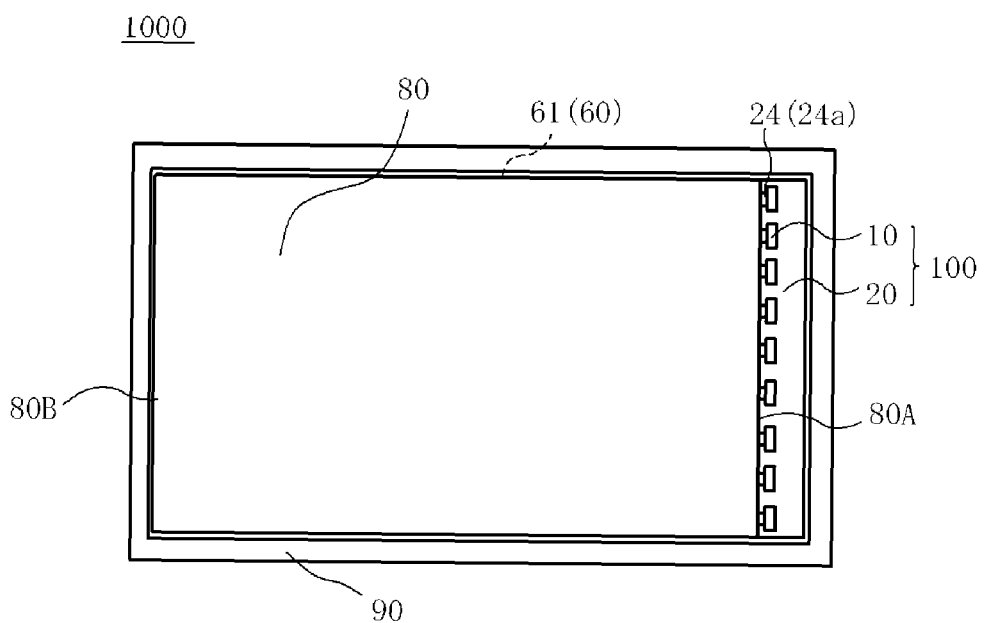
FIG. 4 is a schematic plan view illustrating a configuration of a liquid crystal display device with a light emitting device mounting structural body arranged thereon, according to an embodiment of the present invention.

FIG. 4 is a schematic plan view illustrating a configuration of a lighting device 1000 having the light emitting device mounting structural body 100, a light guide member 80, and a reflecting sheet 61. In the case where the light emitting device mounting structural body 100 is used for a backlight of a lighting device such as a liquid crystal display, together with the light guide member 80, the light emitting device mounting structural body 100 can be placed in a holder 90 which is configured to hold the constituent members of the lighting device 1000.

The light emitting device mounting structural body 100 may be placed at a light incident portion 80A side which is a side surface of the light guide member 80. In detail, the light emitting surface (opening plane of the opening 2) of each of the light emitting devices 10 and the light incident portion 80A of the light guide member 80 are arranged facing with each other. The reflecting sheet 61 may be disposed beneath the light guide member 80. The reflecting sheet 61 can reflect light leaked from the light guide member 80 back toward the light-reflecting member 80, so that can be used as the light-reflecting member 60. The lighting device 1000 may include a diffusion sheet, a prism sheet, a polarizing sheet, a liquid crystal panel (LCD), or the like, over the light guide member 80. The lower surface of the light incident part 80A of the light guide member 80 is arranged lower than the lower surface of the opening 2 of the light emitting device 10, preferably on approximately a same plane with the lower surface of the opening 2 of the projecting portion 4. Each constituent member of the lighting device 1000 will be described in detail below with reference to FIG. 11A to FIG. 14B. FIG. 11C illustrates the range corresponding to the light incident part 80A of the light guide member 80 which is disposed opposite to the light emitting device 10 in the lighting device 1000, and the area facing the light incident part 80A is indicated with hatched lines.

Light Guide Member

Figure 11A:
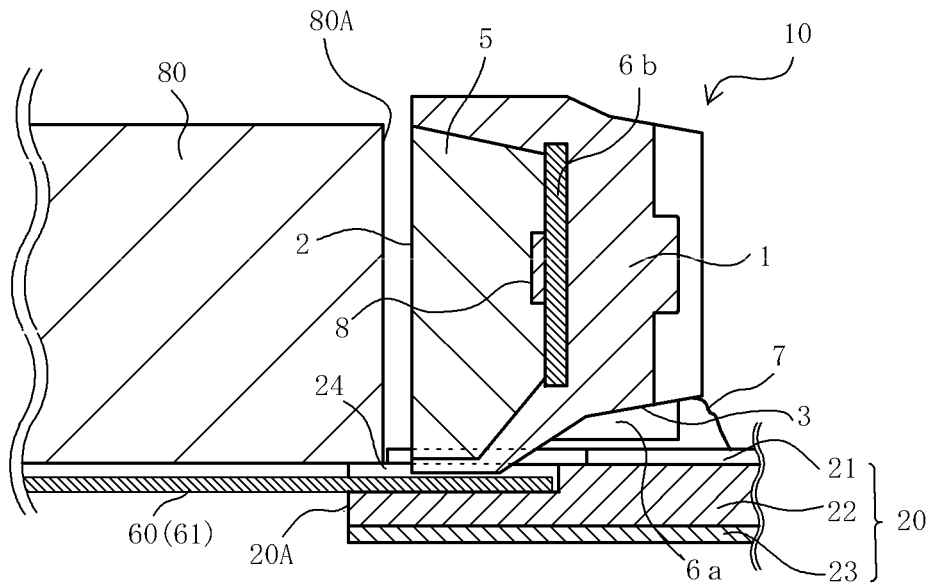
FIG. 11A is a schematic cross-sectional view of a lighting device according to an embodiment of the present invention.
Figure 12:
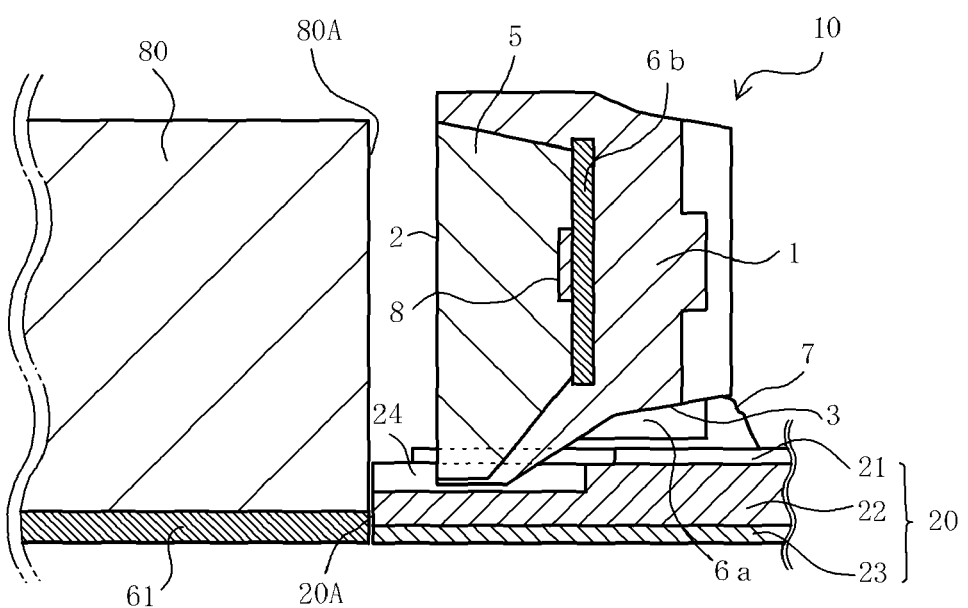
FIG. 12 is a schematic cross-sectional view of a lighting device according to an embodiment of the present invention.

For example, as shown in FIG. 11A, the light guide member 80 can be arranged on the base member 22 of the wiring substrate 20. With this arrangement, the light emitting surface (opening plane of the opening 2) of the light emitting device 10 and the light incident portion 80A of the light guide member 80 are arranged closer to each other. Alternatively, as shown in FIG. 12, the light guide member 80 can be disposed so that the end surface 20A of the wiring substrate 20 at the recess side 24 and the light incident portion 80A of the light guide member 80 are opposite to each other (that is, the light guide member 80 is not disposed on the base member 22). Also, the light guide member 80 may be disposed on the wiring 21 of the wiring substrate 20.

In the present embodiment, the recesses are formed in the periphery of the wiring substrate 24, so that the light incident portion of the light guide member 80 can be arranged at a desired height opposite to the light emitting surface (opening plane of the opening 2) of the light emitting device 10. That is, as shown in FIG. 11A, the lower surface of the light incident part 80A of the light guide member 80 can be arranged on approximately a same plane with the lower surface of the opening 2. The lower surface of the light incident part 80A of the light guide member 80 may be arranged lower than the lower surface of the opening 2 of the light emitting device 10. With this arrangement, not only the light emitted through the opening 2 higher than the opening plane of the recess 24 but also the light emitted through the opening 2 lower than the opening plane of the recess 24 can be efficiently incident on the light guide member 80. Moreover, light emitted downward from the light emitting surface (opening plane of the opening 2) of the light emitting device 10 can be reflected toward the light guide member 80 by the light-reflecting member 60 in the recess 24.

Generally, a planar light guide plate can be used as the light guide member 80. The light guide member 80 is preferably configured so that a side surface serves as the light incident part and the upper surface serves as the light emission surface, but the lower surface (back surface) can be the light incident surface and the upper surface can be the light emitting surface. Other than a rectangular shape, the planar shape of the light guide member 80 can be a circular shape, a polygonal shape, or the like, appropriately changed according to the usage. The thickness of the light guide member 80 may be approximately uniform in its entire region, or gradually reduced or gradually increase, or partially different. In addition, irregularity may be formed on either or both the upper surface and the lower surface of the light guide member 80.

The shapes of the light guide member 80 and the light incident part 80A of the light guide member 80 are determined according to the relation between the height of the surface for arranging the light guide member 80 and the height of the lower surface (i.e., the lowermost surface among the inner walls of the resin molded body 1 which define the opening 2) of the opening 2 of the light emitting device 10. More specifically, in the case where the surface for arranging the light guide member 80 is located approximately coplanar or higher than the lower surface of the opening 2 of the light emitting device 10, a light guide member 80 having approximately flat-plate shape of a light incident portion 80A and having approximately flat lower surface (for example an approximately rectangular shape) can be arranged. In addition, in the case where the surface for arranging the light guide member 80 is located lower than the lower surface of the opening 2 of the light emitting device 10, a light guide member 80 having a light incident portion 80A having a projecting portion 81 can be arranged. In this case, the projecting portion 81 at the lower surface of the light incident portion 80A of the light guide member 80 is arranged in the recess 24 of the wiring substrate 20.

In Embodiment 1, as shown in FIG. 11A, the lower surface of the opening 2 of the projecting portion 4 of the light emitting device 10 is arranged lower than the opening plane (upper surface of the wiring 21) of the recess 24 and also at approximately coplanar or higher than the opening plane of the groove portion 24a. That is, the opening 2 is housed in the recess 24, but is not housed in the groove portion 24a. Moreover, the light guide member 80 is arranged on the base member 22 of the wiring substrate 20. As described above, disposing the light guide member 80 having approximately flat plate shape on the base member 22 allows arrangement of the light incident portion 80A of the light guide member 80 oppositely to approximately entire region of the light emitting surface (the opening plane of the opening 2) of the light emitting device 10.

Figure 11B:
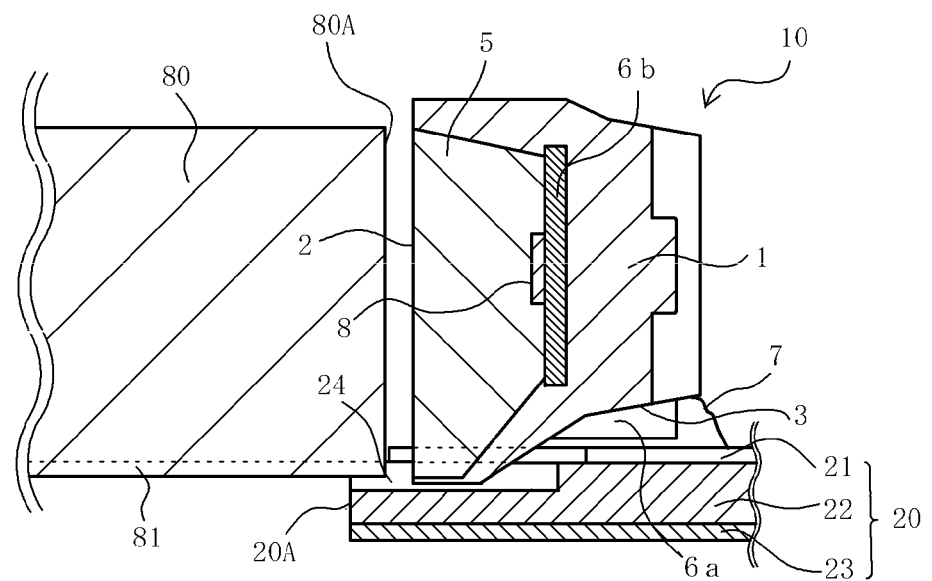
FIG. 11B is a schematic cross-sectional view of a lighting device according to an embodiment of the present invention.
Figure 11C:
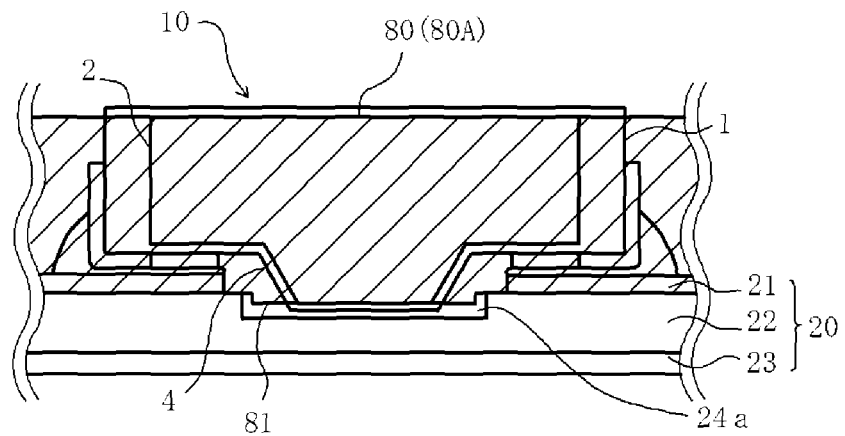
FIG. 11C is a schematic view illustrating a positional relationship between the opening of a light emitting device and a light incident part of a light guide member according to an embodiment of the present invention.

Also, as shown in FIG. 11B and FIG. 11C, in the case where the lower surface of the opening 2 of the projecting portion 4 of the light emitting device 10 is arranged lower than the opening plane of the groove portion 24a, a light guide member 80 having a projecting portion 81 at least projecting to the thickness of the opening 2 which is housed in the groove portion 24a, formed on the lower surface, can be arranged on the base member 22. With this arrangement, the light incident portion 80A of the light guide member 80 can be arranged oppositely to approximately entire region of the light emitting surface (the opening plane of the opening 2) of the light emitting device 10.

In the case where the light guide member 80 has a projecting portion 81 on the lower surface of the light incident portion 80A, the side surface 80B of the light guide member 8 at the opposite side of the light incident portion 80A may not have a projecting portion 81 on the lower surface. For example, as in the light guide member 80 shown in FIG. 14A and FIG. 14B, the light incident portion 80A has projecting portions 81 on the lower surface. The side surface 80B at the opposite side of the light incident portion 80A has an approximately rectangular shape. the projecting portions 81 respectively have a lower surface which is gradually inclined to an approximately flat state. With this arrangement, light from the opening 2 can be efficiently incident to the light incident portion 80A, so that light can be efficiently emitted from the light guide member.

As described above, the lower surface of the light incident portion of the light guide member 80 and the lower surface of the opening 2 (i.e., the lowermost surface among the inner walls of the resin molded body 1 which define the opening 2) of the light emitting device 10 can be aligned by adjusting the shape of the light guide member 80. Accordingly, light emitted through the opening 2 housed in the recess 24 (groove portion 24a) of the wiring substrate 20 can be efficiently incident to the light incident portion of the light guide member 80. Further, the luminance of the light emitting device 1000 can be improved. Moreover, in the case where the light guide member 80 is arranged on the wiring 21 of the wiring substrate 20, arranging the light guide member 80 having projecting portions 81 on the lower surface allows housing of the projecting portions 81 of the light guide member 80 in the recess 24 of the wiring substrate 20 respectively. Thus, the lower surface of the opening 2 and the lower surface 80 of the light guide member 80 can be aligned.

Further, in the case where the end surface 20A of the wiring substrate 20 and the light incident portion 80A of the light guide member 80 are arranged opposite to each other, as shown in FIG. 12, arranging the light guide member 80 having an approximately flat plate shape allow for an arrangement of the light guide member 80 with the light incident portion 80A also covering the lower surface of the opening 2.

The light incident portion 80A of the light guide member 80 is preferably arranged at approximately coplanar to or higher than the upper surface of the opening 2 of the light emitting device 10. That is, the thickness of the light incident portion 80A of the light guide member 80 is preferably same or greater than the thickness of the upper surface to the lower surface of the opening 2 of the light emitting device 10. Accordingly, for example, the thickness of the light incident part 80A of the light guide member 80 according to Embodiment 1 shown in FIG. 11A may be about 0.6 mm to about 0.8 mm. Also, the light incident portion 80A of the light guide member 80 shown in FIG. 11B and FIG. 11C may have, for example, an approximately flat plate shape with a thickness of about 0.4 mm to about 0.8 mm, and projecting portions 81 having a thickness of about 0.05 mm to about 0.2 mm are formed thereon.

The material of the light guide member 80 allows light emitted from the light emitting device 10 to penetrate therethrough. More specific examples of the materials include acrylic resins, polycarbonate resins, PMMA resins, polycarbonate resins, polystyrene resins, and glass. The projecting portions 81 of the light guide member 80 as described above may be formed by way of injection molding, or by way of pressure molding under heating.

Reflecting Sheet

The reflecting sheet 61 is arranged below the light guide member 80. The reflecting sheet 61 is preferably arranged in the recess 24 of the wiring substrate 20. In detail, a reflecting sheet 61 is provided with a projecting portion 62, which has a width and a depth not greater than that of the recess 24 of the wiring substrate 20, in a periphery of the reflecting sheet in plan view. The projecting portion 62 of the reflecting sheet 61 can be disposed by inserting between the lower surface of the projecting portion 4 of the light emitting device 10 of the light emitting device and the bottom surface of the recess 24 of the wiring substrate 20 of the mounting structural body 100. Thus, the reflecting sheet 61 can be arranged under the bottom surface of the light emitting device 10 and extended to under the lower surface of the light guide member 80. Accordingly, the light leaking downward from the resin molded body 1 of the light emitting device 10 and the light emitted downward through the opening of the light emitting device 10 can be reflected at the reflecting sheet 61 toward the light guide member 80. The projecting portions 62 of the reflecting sheet 61 can be formed by, for example, drawing out a metal mold.

As shown in FIG. 12, in the case where the end surface 20A of the wiring substrate 20 and the light incident portion 80A of the light guide member 80 are disposed opposite to each other, the reflecting sheet 61 may not have the projecting portions 62. For example, a reflecting sheet 61 having a rectangular shape in top view can be disposed under the light guide member 80 so that the end surface of the reflecting sheet 61 is opposite to the end surface 20A of the wiring substrate 20. The reflecting sheet 61 may be disposed under the wiring substrate 20.

Embodiment 2

Figure 5:
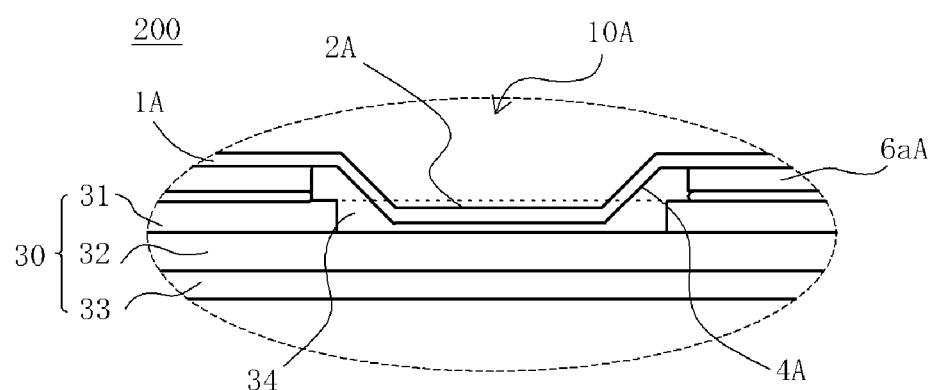
FIG. 5 is a partially enlarged view of a portion in the vicinity of a wiring substrate and a projected portion of a light emitting device mounting structural body according to an embodiment of the present invention.

FIG. 5 is a partially enlarged view showing a portion of the wiring substrate 30 of the light emitting device mounting structural body 200 in the vicinity of a projecting portion 4A of the light emitting device 10A. The recess 34 of the wiring substrate 30 of the light emitting device mounting structural body 200 is defined by the upper surface of the base member 32, which does not have a groove and has an approximately flat surface, and a portion of the wirings 31. Also, the lower surface (i.e. the lowermost surface of the inner walls of the resin molded body 1 defining the opening 2) of the opening 2A of the resin molded body 1A of the light emitting device 10A is located lower than the lower surface of the outer lead 6aA of the light emitting device 10A, and also lower than the upper surface (i.e. the opening plane of the recess 34) of the wiring 31 of the wiring substrate 30. The projecting portion 4A of the light emitting device 10A has a thickness in the height direction smaller than the thickness in the height direction of the projecting portion 4 according to Embodiment 1. In addition, a back-surface wiring which is connected to the light-reflecting member 60 and the wiring 31 on the upper surface of the base member 32 through a via-hole or the like, and which is exposed on the back surface of the wiring substrate 30 may be disposed as a constituent layer 33 below the base member 32. The light-reflecting member may be disposed in the recess 34. The configurations other than that described above is substantially same as the light emitting device mounting structural body 100 according to Embodiment 1 and descriptions of those similar configurations may be appropriately omitted.

The wirings 31 can be formed by using similar materials and method as that used for the wirings 21 of the light emitting device mounting structural body 100. In Embodiment 2, the thickness of the wirings 31 in the height direction defines the depth of the recess 34. The wirings 31 may have a thickness of about 18 μm to about 70 μm. As described above, defining the recess 34 by the approximately flat upper surface of the base member 32 and the wirings 31 allows avoiding the formation of the groove in the base member 32 or of a multilayer structure, so that mass productivity can be enhanced.

In the light emitting device mounting structural body 200 according to Embodiment 2, a wider light emitting surface (opening 2A) of the light emitting device 10A can be employed, while maintaining its mounting property of the light emitting device 10A and the wiring substrate 30 and the thinness of the light emitting device mounting structural body 200. Moreover, the recesses 34 are provided at the periphery of the wiring substrate 30, so that light emitting through the opening 2A housed in each recess can be efficiently emitted. Further, in the lighting device having the light emitting device mounting structural body 200 mounted with which the light emitting device 10A according to the present embodiment, the light emitted through the opening 2 housed in the recess 24 (groove portion 24*a*) of the wiring substrate 30 can be efficiently incident to the light incident portion of the light guide member 80. Accordingly, the luminance of the light emitting device 1000 can be improved.

Embodiment 3

Figure 10:
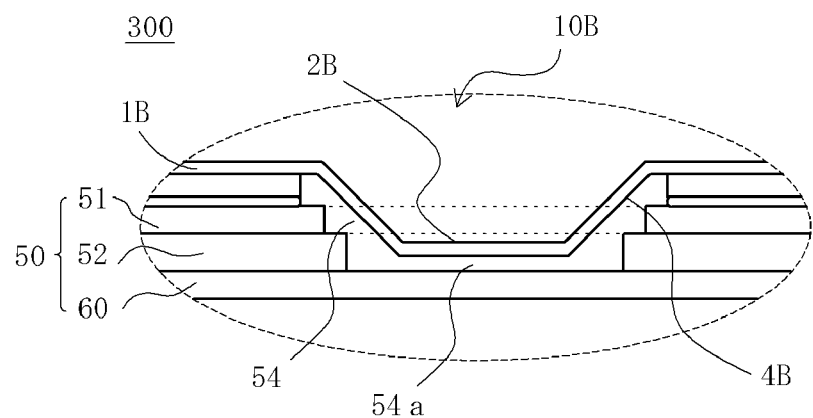
FIG. 10 is a partially enlarged view showing a portion in the vicinity of a wiring substrate and a projected portion of a light emitting device mounting structural body according to an embodiment of the present invention.

In the light emitting device mounting structural body 300 according to Embodiment 3, as shown in FIG. 10, the light emitting device 10B is mounted on the wiring substrate 50. The wiring substrate 50 is provided with the groove portion 54*a* penetrating the base member 52, so that at least the side surfaces defining the recess 54 are constituted with the wirings 51 and the side surfaces defining the groove portion 54*a* (through hole), and an upper surface of a layer (for example, an upper surface of the light-reflecting member 60 such as a reflecting sheet etc. in the present embodiment) which is disposed beneath the base member 52 is arranged beneath the recess 54. That is, at least a portion of the light-reflecting member 60 is arranged at a location defining the bottom surface of the recess 54 (groove portion 54*a*). The projecting portion 4B of the light emitting device 10B has a thickness in the height direction greater than the thickness in the height direction of the projecting portions 4 and 4A according to Embodiment 1 and Embodiment 2. Further, the projecting portion 4B and the opening 2B are housed in the groove portion 54*a*. The configurations other than that described above is substantially same as the light emitting device mounting structural body 100 according to Embodiment 1 and descriptions of those similar configurations may be appropriately omitted.

The penetrating groove portion 54*a* can be formed easily by the method used for forming the groove portion, as well as by punching etc. With this arrangement, mass productivity can be enhanced. As illustrated in Embodiment 3, with the penetrating groove portion 54*a*, the depth of the recess can be easily adjusted by adjusting the thickness of the wirings 51 and the base member 52. Accordingly, a deep recess 54 is easily formed, and thus the projecting portion 4B and the opening 2B of the light emitting device 10B are easily expanded downward. Thus, the luminance of the light emitting device 10B can be easily improved, and the luminance of the light emitting device mounting structural body 300 and a lighting device which employs the light emitting device mounting structural body 300 can be improved. For example, according to the light emitting device 10B of the present embodiment, the opening 2B can be increased by about 3% to about 10%, and the luminance can be increased by about 1% to 3%, respectively compared to the opening 2 of the light emitting device 10 of Embodiment 1.

EXAMPLE 1

The light emitting device mounting structural body 100 according to Example 1 has a structure illustrated in FIG. 1. The light emitting device 10 is a side-emission type and a SMD-type LED. The external dimensions of the resin molded body 1 (except for the projecting portion 4) of the light emitting device 10 are, in the front view, about 0.475 mm in length and about 3.8 mm in width, and the external dimensions of the projecting portion 4 are, in the front view, about 0.14 mm in length and about 1.7 mm to about 2.3 mm in width. The resin molded body 1 which serves as a package for the light emitting device 10 defines an opening 2 which serves as the light emitting region. In the front view, the opening 2 is formed slightly smaller than the resin molded body 1 and defined in an approximately T-shape which is in conformity to the resin molded body 1. The dimensions of the opening 2 are, in the front view, about 0.35 mm in length and about 2.8 mm in width, and the dimensions of the opening in the projecting portion 2 are, in the front view, about 0.325 mm in length and about 2.18 mm in width. The thickness of the wall portions of the resin molded body 1 (a distance between the lower surface of the opening 2 and the bottom surface of the resin molded body 1) is about 0.05 mm.

The resin molded body 1 is made of a polyphthalamide resin which contains titanium oxide and wallastonite, and integrally formed with a pair of positive and negative lead frames 6. The pair of lead frames 6 is made of copper alloy with silver-plated surface, and a portion of both serve as a pair of inner leads 6*a* which define the bottom surface of the opening 2. A pair of outer leads 6*b* projecting to outside of the resin molded body 1 is respectively bent along a pair of arrangement portions 3 of the resin molded body 1. The thickness of the outer leads 6*b* at the arrangement portions 3 is about 0.125 mm. The projecting portion 4 is projected downward about 0.2 mm than the outer leads 6*b* at the arrangement portion 3.

A light emitting element 8 is mounted in the opening 2 (on the inner lead 6*a*) of the resin molded body 1. The light emitting element 8 is a light emitting diode which has an n-type layer, an active layer, and a p-type layer of nitride semiconductors stacked on a sapphire substrate, and can emit blue light (emission wavelength of about 460 nm). The electrodes of the light emitting element 8 are disposed on the upper surface (semiconductor layer) side and each has a pad electrode for bonding and an extension electrode extending from the pad electrode. The light emitting element 8 is adhered to the inner leads 6*a* by a silicone resin which has light-transmissive property, and the pad electrodes are connected to a pair of positive and negative lead frames 6 by gold wires 9, respectively.

The sealing member 5 is filled to protect the light emitting element 8 and the wires 9 in the opening 2. The sealing member 5 may be made of a silicone resin which is the base material, and contains a YAG fluorescent material, and the upper surface of the sealing member 5 is approximately coplanar to the upper surface of the resin molded body 1. The upper surface of the sealing member 5 filled in the opening 2 serves as the light emitting surface (front surface) of the light emitting device 10.

In the light emitting device mounting structural body 100 according to Example 1, the light emitting device 10 constituted as described above is mounted on the wiring substrate 20. The wiring substrate 20 according to the present example has a thickness of about 0.64 mm and a depth of about 1.7 mm, and glass epoxy is used for the base member 22. The base member 22 has a thickness of about 0.5 mm and groove portions are formed with a depth of about 0.23 mm in the periphery of the base member 22. In front view, the groove portion 24 has a width of about 1.7 mm, and a depth of about 1.1 mm. On the base member 22, the wiring 21 of copper is deposited with a thickness of about 70 μm, at about 0.2 mm outer side of the groove portion 24*a*. Accordingly, in a front view, the width of the opening of the recess 24 of the wiring substrate 20 is about 2.1 mm and the depth of the recess 24 is about 0.3 mm which is a sum of the depth of the groove portion 24a and the thickness of the wiring 21. The groove portion 24a is formed in the periphery of the base member 22, so that the recess 24 is also formed in the periphery of the wiring substrate 20.

The outer lead 6a at the arrangement portion 3 and the wiring 21 are electrically connected by a solder which serves as an adhesive member 7. The thickness in the height direction (i.e. the distance between the opening plane of the recess 24, that is, the upper surface of the wiring 21, and the lower surface of the projecting portion 4) of the projecting portion 4 housed in the recess 24 is about 0.15 mm. The thickness in the height direction of the opening 2 housed in the recess 24 is about 0.088 mm. A distance between the lower surface of the projecting portion 4 and the bottom surface defining the recess 24 is about 0.15 mm.

Figure 13:
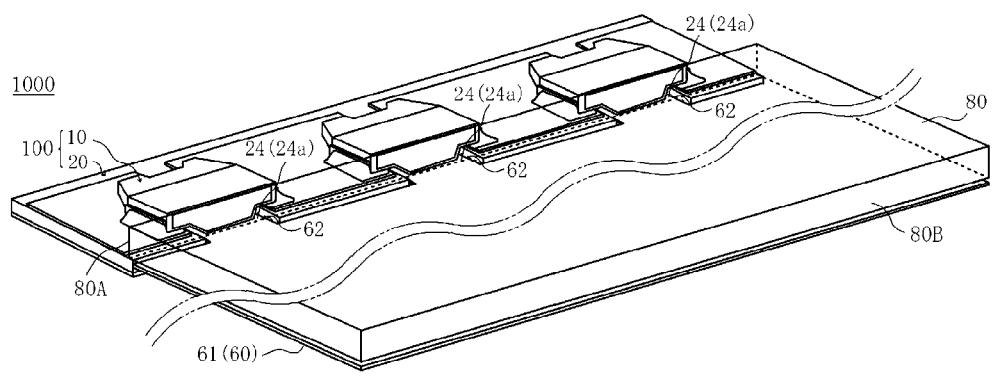
FIG. 13 is a schematic perspective view of a lighting device according to an embodiment of the present invention.
Figure 14A:
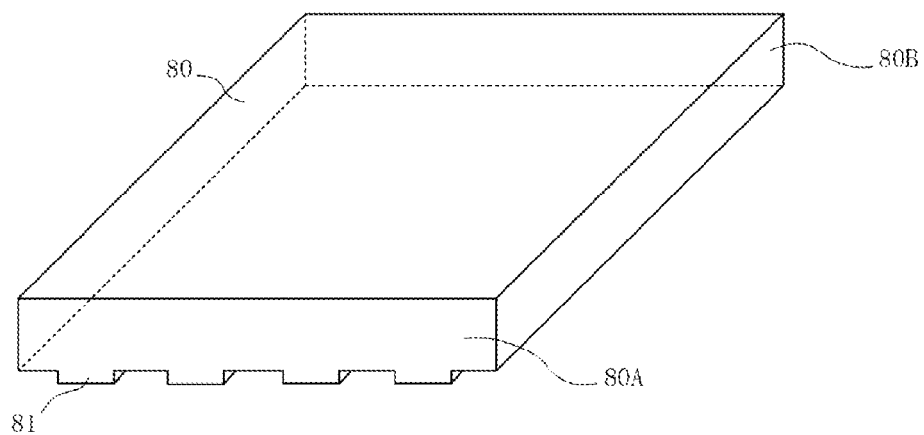
FIG. 14A is a schematic perspective view of a light guide member of a lighting device according to an embodiment of the present invention.
Figure 14B:
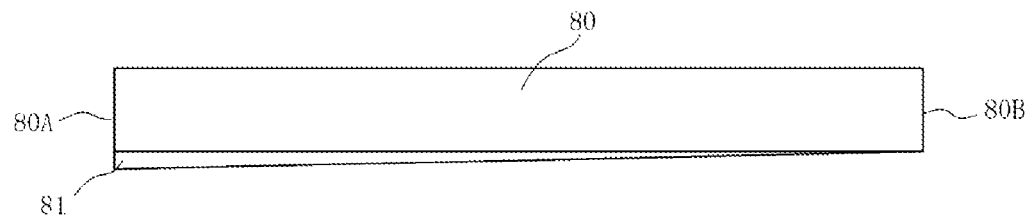
FIG. 14B is a schematic view of a light guide member viewed from a side surface side of a lighting device, according to an embodiment of the present invention.

The lighting device 1000 according to Example 1 includes, as shown in FIG. 13, a light emitting device mounting structural body 100, a light guide member 80, and a reflecting sheet 61. In Example 1, as the light-reflecting member 60, a sheet-shaped reflecting sheet 61 made of a polyethylene terephthalate (PET) which contains barium titanate is disposed in the recess 24 (groove portion 24a). The reflecting sheet 61 has been prepared with a plurality of projecting portions 62 arranged in conformity to the recesses 24 (groove portions 24a) of the wiring substrate 20, in a top view, so that, as shown in FIG. 8, the projecting portions 62 of the reflecting sheet can be inserted to the recesses 24 after mounting of the light emitting devices 10. Accordingly, in the top view, the projecting portions 62 of the reflecting sheet 61 are formed with a size in conformity to the recesses 24 (groove portions 24a) of the wiring substrate 20, which is about 1.2 mm by about 0.5 mm in the present example. The reflecting sheet 61 which is the light-reflecting member 60 has a thickness of about 100 μm. FIG. 13 shows a light emitting device mounting structural body 100 with three light emitting devices 10 mounted on the wiring substrate 20 and a reflecting sheet 61 having three projecting portions 62 in its periphery in the top view, but the numbers of the light emitting devices 10 to be mounted and the projecting portions 62 of the reflecting sheet are not limited thereto.

The light guide member 80 according to the present example has an approximately flat plate shape and is arranged over the reflecting sheet 61 and also on the base member 22 of the wiring substrate 20. The light guide member 80 may have a thickness of about 0.82 mm and is disposed so that the light incident portion 80A of the light guide member 80 is disposed opposite to approximately the entire region of the opening 2 of the light emitting device 10 of the light emitting device mounting structural body 100.

The light emitting device mounting structural body according to the embodiments can be used for a backlight light source for liquid crystal display device, various lighting apparatus, a large-sized display device, various display devices for advertising, destination guiding, or the like, further for a digital video camera, image reading apparatus for a facsimile machine, a copying machine, a scanner, or the like, a projector, and so on. As described above, it should be obvious that various other embodiments are possible without departing the spirit and scope of the present invention. Accordingly, the scope and spirit of the present invention should be limited only by the following claims.

What is claimed is:

1. A light emitting device mounting structural body comprising:
  a wiring substrate including:
    a base member, and
    a wiring portion disposed on the base member,
    wherein the wiring substrate has a recess in its upper surface, the recess being located in an outer edge of the wiring substrate; and
  a light emitting device mounted on the wiring substrate, the light emitting device including:
    a resin molded body having a lower surface and a side surface, wherein the lower surface of the resin molded body has an arrangement portion and a projecting portion, the projecting portion projecting further downward relative to the arrangement portion,
    a light emitting element, and
    an outer lead,
    wherein the side surface of the resin molded body has an opening in which the light emitting element is disposed, at least a portion of the opening being located in the projecting portion of the resin molded body,
  wherein a portion of the outer lead of the light emitting device is located between the wiring substrate and the arrangement portion of the resin molded body, and the outer lead is electrically connected to the wiring portion of the wiring substrate at a location under the arrangement portion,
  wherein a portion of the projecting portion of the resin molded body is located in the recess of the wiring substrate, such that at least a portion of the opening is located in the recess of the wiring substrate.

2. The light emitting device mounting structural body according to claim 1, wherein the recess is defined by a portion of the base member defining a groove and a portion of the wiring portion.

3. The light emitting device mounting structural body according to claim 2, wherein at least a portion of the projecting portion that defines a portion of the opening is located in the groove.

4. The light emitting device mounting structural body according to claim 2, wherein the groove penetrates the base member in a thickness direction of the base member.

5. The light emitting device mounting structural body according to claim 1, wherein the recess is defined by the wiring portion.

6. The light emitting device mounting structural body according to claim 1, wherein a light-reflecting member is disposed in the recess.

7. A lighting device comprising:
  a wiring substrate including:
    a base member, and
    a wiring portion disposed on the base member,
    wherein the wiring substrate has a recess in its upper surface, the recess being located in an outer edge of the wiring substrate; and
  a light emitting device mounted on the wiring substrate, the light emitting device including:
    a resin molded body having a lower surface and a side surface, wherein the lower surface of the resin molded body has an arrangement portion and a projecting portion, the projecting portion projecting further downward relative to the arrangement portion,
    a light emitting element, and
    an outer lead,
    wherein the side surface of the resin molded body has an opening in which the light emitting element is disposed, at least a portion of the opening being located in the projecting portion of the resin molded body; and a light guide member configured to guide light from the opening of the light emitting device, wherein a portion of the outer lead of the light emitting device is located between the wiring substrate and the arrangement portion of the resin molded body, and the outer lead is electrically connected to the wiring portion of the wiring substrate at a location under the arrangement portion, wherein a portion of the projecting portion of the resin molded body is located in the recess of the wiring substrate, such that at least a portion of the opening is located in the recess of the wiring substrate, and wherein a light incident part of the light guide member is a side surface of the light guide member and faces the opening of the light emitting device of the light emitting device mounting structural body.

8. The lighting device according to claim 7, further comprising:

a reflecting sheet located under the light guide member, wherein a portion of the reflecting sheet is located in the recess of the wiring substrate of the light emitting device mounting structural body.

9. The lighting device according to claim 8, wherein the reflecting sheet has a projecting portion in its outer edge the projecting portion of the reflecting sheet being located in the recess of the wiring substrate.

10. The lighting device according to claim 7, wherein the light guide member has a projecting portion in its lower surface, a portion of the projecting portion of the light guide member being located in the recess of the wiring substrate.

11. The lighting device according to claim 7, wherein a lower surface of the light incident part is located at a location lower than a lower side of the opening.

12. The lighting device according to claim 7, further comprising:

a reflecting sheet located under the light guide member, wherein the reflecting sheet extends to a location under the wiring substrate.

13. The light emitting device mounting structural body according to claim 1, wherein the wiring substrate is made of a rigid material, and has a thickness in a range of about 0.2 mm to about 0.3 mm.

14. The light emitting device mounting structural body according to claim 1, wherein the wiring substrate is made of a flexible material, and has a thickness in a range of about 0.1 mm to about 0.2 mm.

15. The light emitting device mounting structural body according to claim 2, wherein the groove has an approximately rectangular shape, a tapered shape widening upward, or a shape with a rounded corner in a front view.

16. The light emitting device mounting structural body according to claim 1, wherein the opening has an approximately T-shape in a front view.

17. The light emitting device mounting structural body according to claim 1, wherein the projecting portion has a lower surface that is spaced from a bottom surface of the recess.

18. The light emitting device mounting structural body according to claim 2, wherein the opening has a lower surface that is located lower than an opening plane of the groove.

19. The light emitting device mounting structural body according to claim 1, wherein the outer lead is bent along the arrangement portion, and has a thickness of about 0.125 mm.

20. The light emitting device mounting structural body according to claim 1, wherein the wiring has a surface coated with Ag, Pt, Sn, Au, Cu, Rd, an alloy of Ag, an alloy of Pt, an alloy of Sn, an alloy of Au, an alloy of Cu, an alloy of Rd, silver oxide, or an oxide of silver alloy.

* * * * *